US005494079A

United States Patent [19]
Tiedemann

[11] Patent Number: 5,494,079
[45] Date of Patent: Feb. 27, 1996

[54] STOP-GATE APPARATUS AND METHODS OF USE THEREOF

[76] Inventor: Henry Tiedemann, 41 Tilden Rd., Scituate, Mass. 02066

[21] Appl. No.: 373,002

[22] Filed: Jan. 17, 1995

[51] Int. Cl.⁶ .................................................... F16L 55/10
[52] U.S. Cl. ............................ 138/94.3; 138/94; 138/89
[58] Field of Search ....................... 138/94, 94.3, 94.5, 138/89; 220/210, 346

[56] References Cited

U.S. PATENT DOCUMENTS

| | | | |
|---|---|---|---|
| 608,899 | 8/1898 | Gorman | 138/94.3 |
| 1,054,150 | 2/1913 | Thorsby | 138/94.3 |
| 1,078,271 | 11/1913 | Force et al. | 138/94.3 |
| 1,112,066 | 9/1914 | Hollis | 138/94.3 X |
| 1,357,974 | 11/1920 | Gorman | 138/94.3 |
| 2,214,959 | 9/1940 | Hamer | 138/94.3 |
| 2,271,282 | 1/1942 | Young | 138/94.3 |
| 2,339,970 | 1/1944 | Young | 138/94.3 |

*Primary Examiner*—David Scherbel
*Assistant Examiner*—Patrick F. Brinson
*Attorney, Agent, or Firm*—Gregory B. Butler

[57] ABSTRACT

The present invention relates to a stop-gate apparatus which is used as a means of opening and enclosing a hollow container or conduit carrier. The apparatus is comprised of a coupling body and an enclosure plate. The coupling body is affixed at one end to the hollow container or conduit carrier. At the opposite end of the coupling body, there are two (2) cut-outs which allow the insertion, retention and retraction of the enclosure plate.

8 Claims, 3 Drawing Sheets

5,494,079

STOP-GATE APPARATUS AND METHODS OF USE THEREOF

BACKGROUND

Tradespeople employ a wide variety of tools and materials in the performance of their trade. Some materials can be unusual in their shape and dimension, requiring special handling in their transportation. In particular, plumbers and electricians often use materials which are long and cylindrical in shape such as copper tubing, PVC piping and electrical cable. The transport of these materials typically occurs in containers known and sold as conduit carriers. This method of transporting tubing, pipes and cable has become the custom in both the plumbing and electrical trades.

Typical conduit carriers are elongated, hollow structures installed on the roof racks of vehicles used in the plumbing and electrical services, such as full-size vans, minivans and fiat-bed trucks. Currently, there exists two types of conduit carriers. The first and significantly more expensive type consists of aluminum and is sold as a fully enclosable storage container with a spring up rear door for access to the conduit materials. The rear door is hinged to the storage container and encloses the container by means of a latching device.

The second and less expensive type is simply a length of PVC (i.e., polyvinylchloride) pipe with a length and diameter appropriate for the conduit materials to be transported. When installed on a van used for plumbing or electrical services, the PVC pipe is enclosed at the front with a cemented coupling cap. At the back end, where access to the conduit materials is required, the PVC pipe is enclosed by one of two currently used methods. The first method is available commercially and uses a cemented cap that can open as a door by means of a hinge and a latch. The second method is simply an end cap for a PVC pipe that is threaded and adapted to the PVC pipe by tradespeople themselves. The conduit carrier is opened and closed by unscrewing and screwing the cap to the PVC pipe, respectively.

Both of the above mentioned types of conduit carriers and their respective methods of enclosure, however, can present significant problems in gaining access to the enclosed materials since they frequently become inoperable in inclement outdoor conditions. Particularly, in the winter, water and/or snow seeps into the cap threads or the door seals, hinges and latches. Due to the cold weather, the water and snow freezes, thereby causing difficulty in opening the caps or doors and preventing access to the conduit materials. In addition, the hinged doors and latches for enclosing conduit carriers are made of parts which break over time and usage and must be replaced for continued use of the carriers.

A device or apparatus which circumvents the significant problems mentioned above would be particularly useful for tradespeople in the plumbing and electrical professions and consequently, society at large.

SUMMARY OF THE INVENTION

The present invention relates to a stop-gate apparatus for a conduit carder comprising a coupling body and an enclosure plate. The coupling body is affixable at one end to the conduit carrier and is cut out at the opposite end to allow the insertion, retention and retraction of the enclosure plate.

Another embodiment of the present invention relates to an enclosable conduit carrier comprising a hollow cylinder and an enclosure plate. The hollow cylinder has one enclosed end and one open end. The open end has an upper portion with a first cut-out for the insertion and passage of the entire width of the enclosure plate into the hollow area of the hollow cylinder. There is also a lower portion of the open end with a second cut-out for the insertion and passage of only the lower segment of the enclosure plate, thereby retaining the plate in its operative position. The enclosure plate has a shape, dimension and thickness which allows for its insertion, retention and retraction in operation with the hollow cylinder.

The advantages of the present invention over the prior art include the ease of operating the apparatus, the reliance of its operability in times of inclement weather and the absence of parts which are breakable and require replacement. To operate the present invention, the enclosure plate is simply inserted into the coupling body or hollow cylinder, thereby enclosing the article or materials contained within the structures. To gain access to enclosed articles or materials, the enclosure plate is simply retracted from its operative position. Should snow or ice interfer with the operation of the present invention, any solid object such as a hammer can be employed in an upward movement against the lower segment of the enclosure plate to faclilitate its retraction and removal. Similarly, any solid object could be used for the enclosure plates implacement in the structures (i.e., coupling body or hollow cylinder).

In addition to the advantages in operation of this invention, there is also the advantage that the present invention does not require parts which are subject to breakage or damage, and consequently, require replacement. In the prior art, there are conduit carriers which contain enclosing devices requiring hinges and latches, both of which contain movable parts that will undoubtedly break or become damaged over time and usage, thus requiring their replacement. The present invention is comprised of one movable part, the enclosure plate. This plate is comprised of durable material (e.g., in a preferred embodiment the material is solid aluminum) and is unitary in structure without breakable parts. Thus, the present invention provides not only ease of operation, but also, reliabilty in its operation.

DETAILED DESCRIPTION OF THE INVENTION

Figure 1:
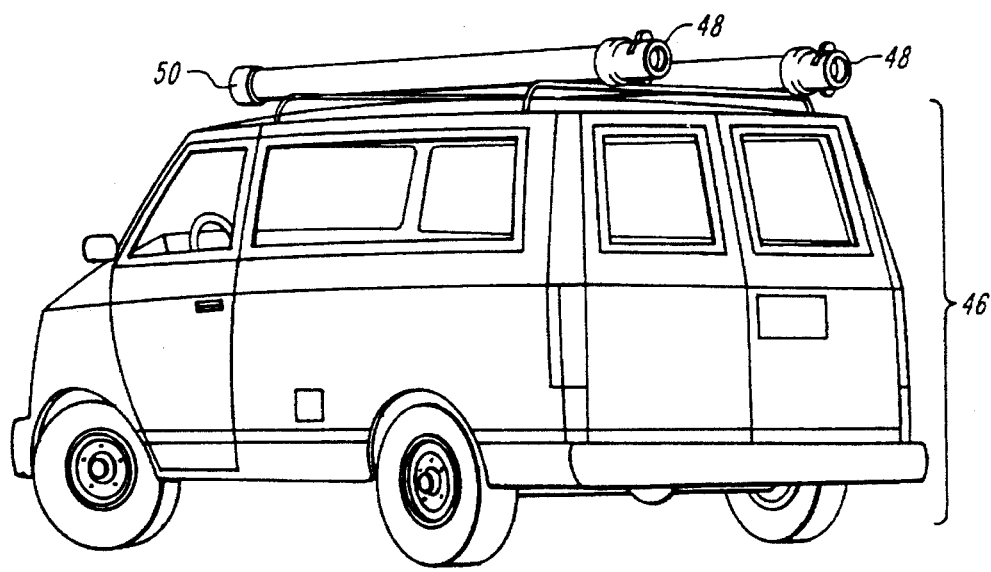
FIG. 1 is a diagramatic representaion of two conduit carriers, each affixed with a stop-gate apparatus, installed on a van used for trade services.

The present invention relates to a stop-gate apparatus which is used as a means of opening and enclosing a hollow container such as a conduit carrier. The apparatus is comprised of a coupling body and an enclosure plate. The coupling body is affixed at one end to the hollow container. At the opposite end of the coupling body, there are two (2) cut-outs to allow the insertion, retention and retraction of the enclosure plate.

Definitions

The following terms are herein defined for the purpose of describing the invention.

AFFIX can be defined as securing or attaching an object to another. In the context of the present invention, the stop-gate appratus is affixed to a hollow container or conduit carrier, whereby the securement or attachment can be achieved with an adhesive agent such as an epoxy resin. Alternatively, the affixation can occur by mechanical means such as bolting the structure together through drilled holes. The term affixable refers to the capablity of an object to be affixed.

ADHESIVE AGENT can be defined as a material, which when applied to surfaces, can join them together and resist their separation. Thus, adhesive agent is a general term used for substances capable of holding materials together by surface attachment. In the present invention, an adhesive agent can be any material or substance which can bond to the surfaces of the coupling body of the stop-gate apparatus and the hollow container or conduit carrier. Examples of adhesive agents include thermosetting agents, which, when cured, form molecular chains that are locked permanently together in a large three dimensional structure. Epoxides, phenolic resins and polyesters are examples of thermosetting agents. As structural adhesives, epoxies are most widely accepted and used.

OPENING (including open) can be defined as an area through which unobstructed access to the interior of a structure is gained; or an unobstructed entrance and exit, not shut or closed. In the context of the present invention, a hollow container, a coupling body or an enclosable container can have an area through which articles or materials can be 1) accessed and removed or 2) implaced for containment.

ARTICLES (including materials) can be defined as any object, thing, device or gadget. In the context of the present invention, an article can be any object which can be placed within a hollow container or enclosable container that can be enclosed with a stop-gate apparatus of the present invention.

Typical articles used in the practice of the present invention to provide enclosure and containment of the articles include materials used by plumbing and electrical tradespeople such as, copper tubing, plastic tubing, steel tubing, galvanized tubing and electrical cable. Recreational objects such as fishing rods, snow skis and snow poles are other examples of articles.

ENCLOSE can be defined as containment by surrounding on all sides. In the context of the present invention, the stop-gate apparatus encloses the articles within the hollow container, conduit carrier or enclosable container by closing the opening of these structures, thereby surrounding the articles on all sides.

CUT-OUT can be defined as the area of an object which is removed from the object as a whole. In the context of the present invention, a cut-out refers to the area of the coupling body of the stop-gate apparatus or the open end of an enclosable container which is removed to create two open spaces for the insertion, retention and retraction of the enclosure plate of the stop-gate apparatus.

HOLLOW CONTAINER can be defined as a thing in which articles or materials can be held, stored, contained or carried. The container, itself, is not solid and has space within. In addition, it has an opening through which articles and materials can be placed within the space of the container. In the context of the present invention, a hollow container can be of varying length, from one inch to several hundred feet. The shape of the container can be of any design which allows the enclosure of the container at the container's opening using the stop-gate apparatus of the present invention. The opening of the container must conform to the shape of the affixable end of the coupling body of the stop-gate apparatus. Examples of such shapes include, but are not limited to a rectangle, a square, a triangle, an octagon and a circle (e.g., as found with a cylinder).

INSERTION can be defined as the introduction into or between the body of something. In the context of the present invention, the enclosure plate of the stop-gate apparatus is introduced into the cut-outs of the coupling body of the stop-gate apparatus, allowing enclosure of the container to which the stop-gate apparatus is affixed. In the case of an enclosable container, the cut-outs and, consequently, the place of insertion of the enclosure plate are proximate to the open end of the enclosable container.

RETENTION can be defined as being held in place or in position. In the context of the present invention, the enclosure plate, after being inserted into the cut-outs of the coupling body of the stop-gate apparatus or the enclosable container is retained in position by way of the forces of gravity on the enclosure plate against the second cut-out of the lower portion of the open end of the coupling body of the stop-gate apparatus or the enclosable container. When the enclosure plate is retained in this position, it obstructs the opening in its entirety and thereby encloses 1) the hollow container or conduit carrier to which the stop-gate apparatus is affixed or 2) the enclosable container. When retained in this position, the enclosure plate is considered to be in its operative position.

RETRACTION can be defined as being withdrawn from a place or position. In the context of the present invention, the enclosure plate is retracted from its retained position in the coupling body of the stop-gate apparatus or the enclosable container, thereby allowing opening of the container to which the stop-gate apparatus is affixed or the enclosable container.

LOCKABLE DEVICE can be defined as any device used to provide restraint, especially a key or combination-operated mechanism used to prevent the operation of something. In the context of the present invention, a lockable device positioned in a space provided in the lower segment of the enclosure plate of the stop-gate apparatus, prevents the retraction of the enclosure plate and thus access to the articles or materials contained within the hollow container, conduit carder or enclosable container. When the lockable device is unlocked and removed, access to the articles and materials is regained.

Stop-Gate Apparatus

The stop-gate apparatus is comprised of two main components, the coupling body and the enclosure plate. The apparatus is used in conjunction with a hollow container or conduit carrier.

Coupling Body

The coupling body is a structure which possesses the following characteristics:

A) Open-Ended—the coupling body must have at least two ends which are open to allow the passage of articles and materials;

B) Affixable End—the coupling body must have one end which is affixable to the hollow container or conduit carrier. There are two requirements for the affixable end. First, this end must conform to the shape of an opening of the hollow container or conduit carrier to which the coupling body can be affixed. For example, the hollow container or conduit carrier can have an opening with a shape including, but not limited to the following: a circle, a rectangle, a square, a triangle, and an octagon. The coupling body must have one end with a shape that matches the opening of the hollow container or conduit carrier (i.e., a circle, a rectangle, a square, a triangle, and an octagon, repectively). Secondly, the overall dimension of the affixable end must be slightly larger to fit over the opening of the hollow container or conduit carrier or slightly smaller to fit within the opening. These requirements of conforming shape and slightly smaller or larger dimensions are neccessary for the coupling body to be properly affixed to the hollow container or conduit carrier. Affixation can occur by bonding an adhesive agent between the surfaces of the carrier container/conduit carrier and the affixable end of the coupling body. Alternatively, the two structures can be held together mechanically with means for fastening together and bolting the structures together through drilled holes.

C) Length—the coupling body must be of sufficient length to allow it to be affixed at one end to the hollow container/conduit carder and cut-out at a second end for the placement of an enclosure plate.

D) Enclosure End—the coupling body must have a second end which is capable of enclosure. This end is cut-out to allow the insertion, retention and retraction of the enclosure plate. A first cut-out occurs on top of the coupling body as it is positioned in relation to the hollow container/conduit carrier and the motor vehicle. The first cut-out is wide and long enough to allow the complete passage of the enclosure plate into the coupling body. A second cut-out occurs on the bottom of the coupling body as it is positioned in relation to the hollow container/conduit carrier and the motor vehicle. The second cut-out is wide and long enough to allow the passage of only the lower segment of the enclosure plate, thereby retaining the enclosure plate within the coupling body and enclosing the hollow container or conduit carrier.

E) Composition—the coupling body can be comprised of any substance which allows for the above characteristics. Typically, however, the composition will match that of the hollow container or conduit carrier to which the coupling body is to be affixed. For example, if the hollow container or conduit carrier is comprised of polyvinylchoride (i.e., PVC), the coupling body can also be comprised of PVC.

F) Optionally, the coupling body can have a securing device for times when the enclosure plate is not in its operative position. This device can be simply a means of attaching the enclosure plate to the coupling body such as with a rope, line or wire bolted to the side of the coupling body and connected to the upper segment of the enclosure plate. Alternatively, the securing device could be a holster for the enclosure plate, positioned on the side of the coupling body.

Construction of a coupling body can be achieved manually using a drill with a router bit (See Example One) or mass manufactured using an injection molded process.

Enclosure Plate

The enclosure plate is a structure with the following characteristics:

A) Segments—the enclosure plate is comprised of three (3) segments, an upper, middle and lower segment. When the enclosure plate is in its operative position, the upper segment extends above the coupling body, the middle segment occupies the opening of the coupling body and thereby effectuates the enclosure of the hollow container or conduit carrier, and the lower segment extends below the coupling body. The upper segment can possess a means of connecting to a securing device for the purpose of keeping the plate attached to the coupling body when it is not in its operative position. The lower segment can possess a means for which a locking device can be attached, thereby preventing the retraction of the enclosure plate.

B) Shape—the enclosure plate must possess a shape which allows the insertion and passage of the lower and middle segments through the first cut-out of the coupling body, but does not allow the insertion and passage of the middle segment through the second cut-out of the coupling body, thereby retaining the enclosure plate and providing enclosure for the hollow container or conduit carrier. The shape also must obstruct the opening of the coupling body in its entirety when the enclosure plate is in its operative position (i.e., fully inserted).

C) Width—the enclosure plate must have a width which allows its insertion and passage through the cut-outs of the coupling body.

D) Composition—the enclosure plate must be comprised of a material which is of sufficient strength to prevent the passage of articles or materials from a hollow container or conduit carrier when the enclosure plate is in its operative position. A preferred embodiment of an enclosure plate would be corrosion resistant. Examples of such materials can be metals (e.g., aluminum and steel) and plastic (e.g., polyvinylchloride).

Constuction of an enclosure plate can be achieved manually using a carbide tip band saw and cutting the plate from sheet metal or mass manufactured using a die for stamping enclosure plates out of sheet plates of metal such as aluminum.

Preferred Embodiment of the Invention

Figure 3:
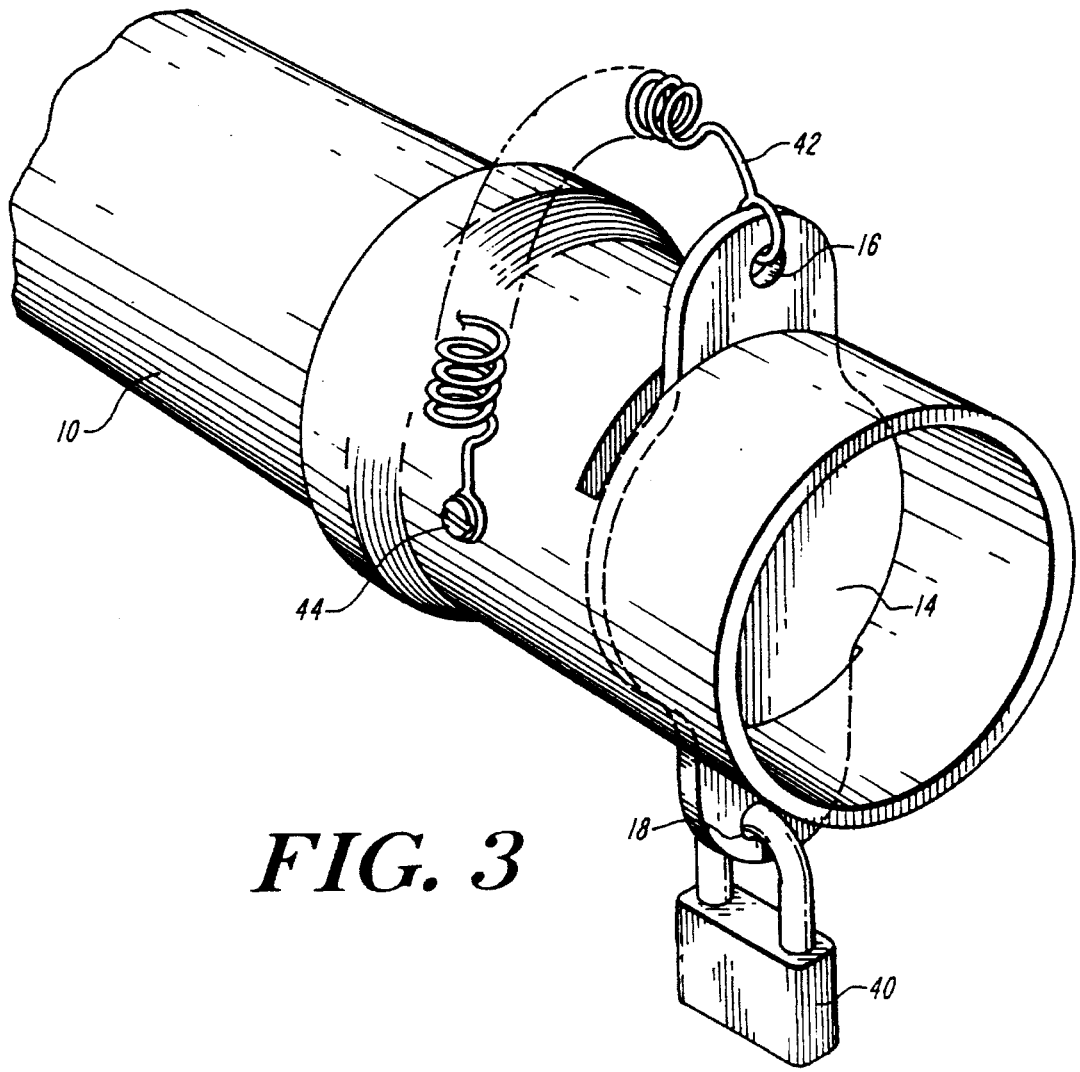
FIG. 3 is a diagramatic representation of a stop-gate apparatus for a cylindrical conduit carrier with the coupling body of the stop-gate apparatus affixed to the conduit carrier, and the enclosure plate of the stop-gate apparatus in its operative position to enclose the carrier; with a locking device to prevent the plates removal and an securing device for times when the enclosure plate is not in its operative postion.
Figure 2:
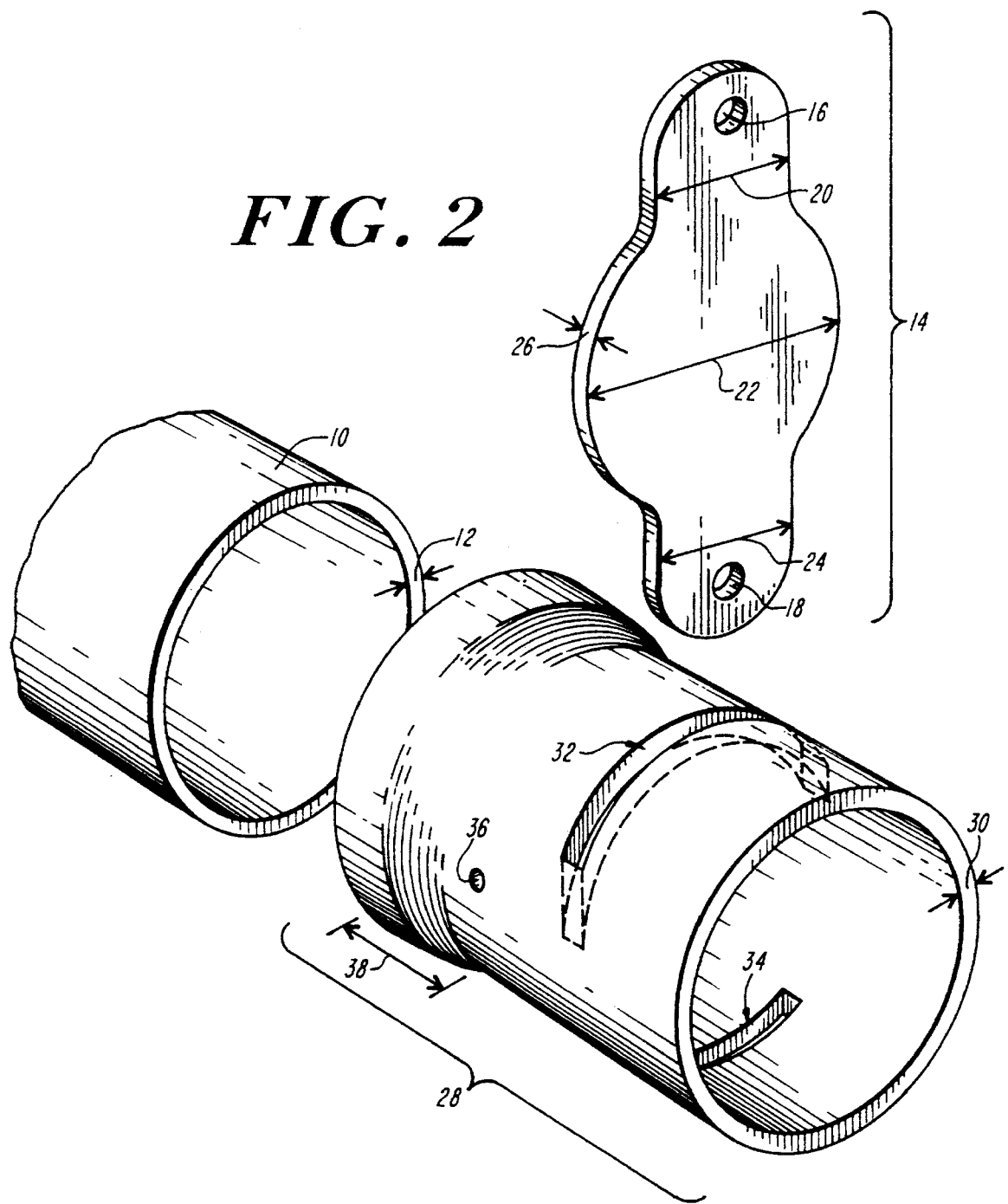
FIG. 2 is a diagramatic representation of a coupling body and enclosure plate of the stop-gate apparatus and their respective components and characteristics.
Figure 4:
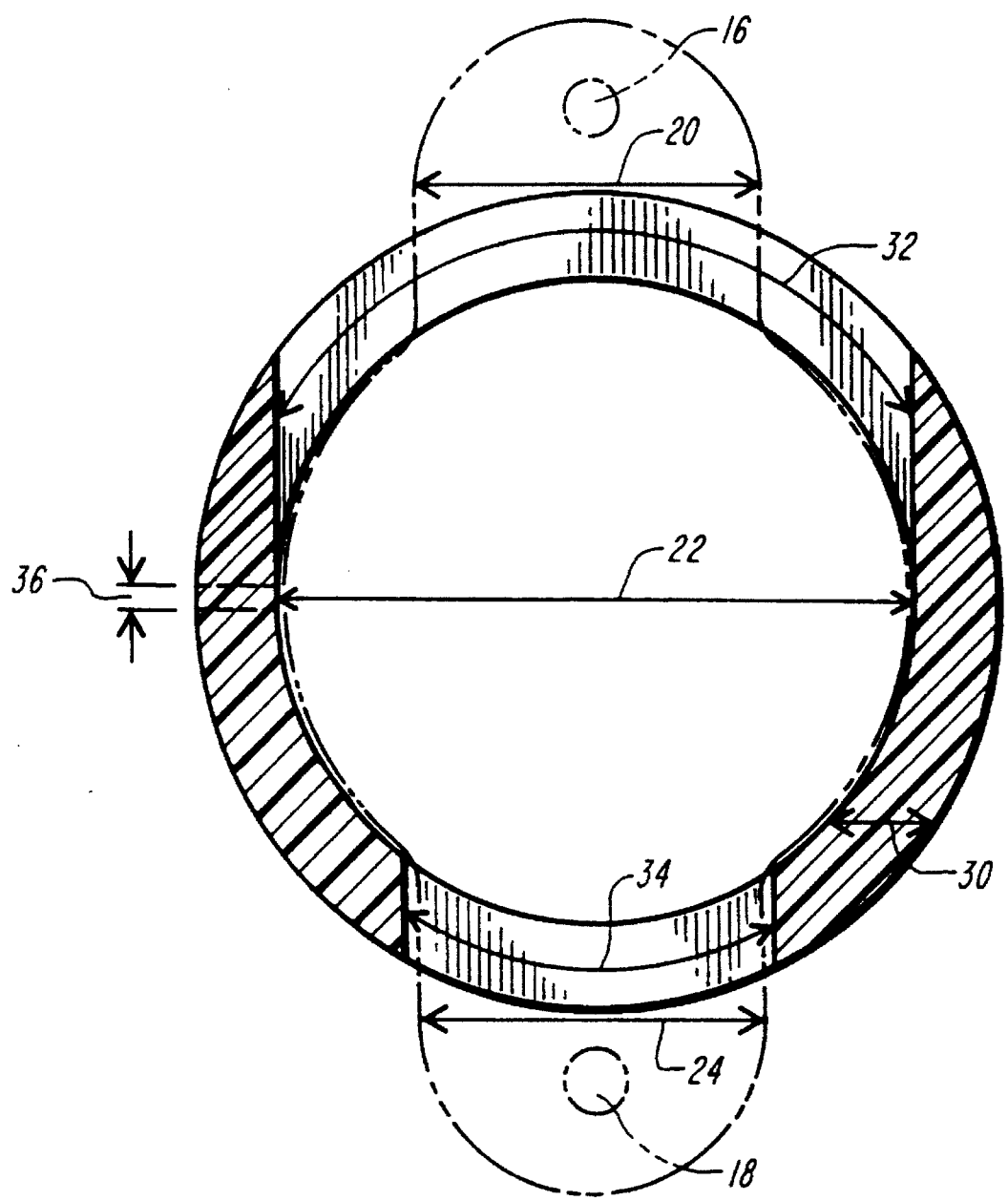
FIG. 4 is a diagramatic representation of a cross-sectional view of the stop-gate apparatus, illustrating the relationship of the cut-outs with the enclosure plate.

The preferred embodiment of the present invention relates to a stop-gate apparatus used in conjunction with a conduit carrier. The preferred embodiment and its use is illustrated in FIGS. 1 thru 4. The stop-gate apparatus (#48) is affixed to a conduit carrier (#10) which can be mounted on the roof-racks of vehicles (#46) used in various trade services.

The conduit carder can be comprised of cylindrical polyvinylchloride (PVC) piping. These carders are commercially available and are of a variety of lengths, diameter and wall thickness (#12). In typical use, the carriers are 10 to 15 feet in length; 6 to 10 inches in diameter; and 0.1 to 1.0 inch in wall thickness. The conduit carriers are used to transport articles such as copper tubing, smaller PVC piping and electrical cable.

The stop-gate apparatus is affixed at one end (#38) to the PVC conduit carrier (#10). This affixable end of the coupling body of the stop-gate apparatus is of a slightly larger diameter than the PVC conduit carrier. The end can be bell shaped in relation to the diameter of the remainder of the coupling body or it can be of the same diameter of the coupling body. The length of the coupling body can vary, but typically, is 6 to 12 inches in length. The wall thickness of the coupling body (#30) should be comparable to the wall thickness of the PVC conduit carrier. The affixable end is affixed to the PVC conduit carrier with adhesive agent or cement (See Example Two).

The opposite end of the coupling body has two areas which are cut-out from the coupling body, into which the enclosure plate can be inserted, retained and retracted. The first cut-out (#32) occurs in the upper portion of the coupling body. This cut out is of sufficient width and length to allow the insertion of the upper (#20), middle (#22) and lower (#24) segments of the enclosure plate (#14). The second cut-out (#34) occurs in the lower portion of the coupling body and is of sufficient width and length to allow only the insertion of the lower segment (#24) of the enclosure plate (#14). When the enclosure plate is fully inserted, in its operative position, the middle segment (#22) obstructs entirely the opening or passageway into the PVC conduit carrier.

There can be a position or hole (#16) in the upper segment to which a securing device (#42) can be attached. The securing device, itself, is attached to the coupling body by way of a nut and bolt (#44) through a hole (#36) in the side of the coupling body. This securing device is an optional feature of the stop-gate apparatus.

There can be position or hole (#18) in the lower segment of the enclosure plate for the placement of a locking device (#40), such as a key lock. When in place and locked, the device will prevent the retraction of the enclosure plate and, consequently, access to the articles and materials within the conduit carrier.

The enclosure plate can be comprised of solid aluminum which can be cut to conform to the shape requirements or punched out of sheet aluminum.

The invention is further illustrated by the following specific examples, which are not intended to be limiting in any way.

Examplification

Example 1: Process of Constructing a Stop-Gate Apparatus

A. Coupling Body

1) A coupling body of standard size (six to ten inches in length) was obtained from a supply house;
2) At one end of the coupling body, the appropriate areas for the cut-outs of the upper and lower portions were marked for removal;
3) A drill with a router bit was manually plunged into the appropriate marked areas and said areas were removed. The bit had sufficient width to remove enough of the areas to allow the insertion and retraction of the enclosure plate;
4) The edges of the cut-outs were filed and the coupling body cleaned.
5) Alternatively, a steel collar was constructed with the cut-out areas removed, which fit over the coupling body and was employed as a guide for the router bit cutting process.

B. Enclosure Plate

1) A pattern was constructed with dimensions of an enclosure plate to be used with a coupling body of a respective size and shape;
2) Using the pattern, the shape of the enclosure plate was marked out on a sheet of aluminum metal;
3) The pattern was cut-out using a band saw with a carbide tip or a jig saw;
4) The edges were filed and cleaned;
5) A hole was bored in the lower segment of the enclosure plate for placement of a locking device.

Example 2: Installation of the Stop-Gate Apparatus onto a PVC Conduit Carrier

1) To the end of a PVC pipe to which the coupling body of the stop-gate apparatus was to be affixed, all burrs from the end of the PVC pipe were removed with a knife, file or plastic deburring tool;
2) The outside of the PVC pipe was cleaned of any dirt, moisture or grease with a clean, dry cloth;
3) The inside of the affixable end of the coupling body of the stop-gate apparatus was cleaned of any dirt, moisture or grease with a clean, dry cloth;
4) Using an applicator, primer was freely applied to the end of the PVC pipe and the coupling body equal to the depth to which the coupling body was affixed to the PVC pipe;
5) A full even layer of cement was applied to the PVC pipe and the coupling body while the surfaces were still wet with primer. Care was taken not to let cement puddle or allow the cement to run down the inside of the pipe;
6) The PVC pipe and the coupling body were fitted together while the cement is still fluid. The PVC pipe was pushed into the coupling body using a turning rotation until the desired depth was acheived;
7) The PVC pipe and the coupling body were held together for 15 to 30 seconds to offset the tendancy of the pipe to move out of the coupling body;
8) After assembly, excess cement was wiped from the pipe at the end of the fitting; and
9) The assembled PVC pipe and the coupling device of the stop-gate apparatus was allowed to sit until the cement adequately cured.

Equivalents

Those skilled in the art will recognize, or be able to ascertain using no more than routine experimentation, many equivalents to the specific embodiments of the invention described specifically herein. Such equivalents are intended to be encompassed in the scope of the following claims.

I claim:

1. A stop-gate apparatus for a cylindrical conduit carrier used for the containment of articles, said stop-gate apparatus comprising: a) a cylindrical coupling body and b) an enclosure plate wherein;

said cylindrical coupling body:
having a first open end for affixation to said conduit carrier;
having a second open end which has an upper portion with a first cut-out for the insertion of said enclosure plate into the hollow area of said coupling body and having a lower portion with a second cut-out for the retention and partial extension of said enclosure plate outside said coupling body; and said enclosure plate:
having 1) an upper segment which extends outside said upper portion of said coupling body when said enclosure plate is fully inserted into said conduit carrier; 2) a middle segment which obstructs the entire hollow area of said hollow, coupling body when said enclosure plate is fully inserted into said coupling and is greater in width than said second cut-out of said lower portion; and 3) a lower segment which extends outside said lower portion of said coupling body when said enclosure plate is fully inserted into said coupling body.

2. A stop-gate apparatus of claim 1 wherein said coupling body is comprised of a polymer.

3. A stop-gate apparatus of claim 2 wherein said polymer is polyvinylchloride.

4. A stop-gate apparatus of claim 1 wherein said articles consist essentially of copper tubing, plastic tubing, and electrical cable.

5. A stop-gate apparatus of claim 1 wherein said coupling body cylinder is affixed to said conduit carrier with an adhesive agent.

6. A stop-gate apparatus of claim 1 wherein said lower segment of said enclosure plate has a cut-out for the placement of a lockable device.

7. A stop gate apparatus of claim 1 wherein said upper segment of said enclosure plate has a cut-out for the attachment of said enclosure plate to said hollow, open-ended cylinder.

8. An enclosable container comprising a hollow cylinder and an enclosure plate wherein 1) said hollow cylinder has one open end which has an upper portion with a first cut-out for the insertion of said enclosure plate into said hollow cylinder and having a lower portion with a second cut-out for the retention and partial exit of said enclosure plate; and 2) said enclosure plate having the shape, dimension and thickness which allows the insertion, retention and retraction of said enclosure plate.

* * * * *